United States Patent [19]

Doman

[11] Patent Number: 4,515,525

[45] Date of Patent: May 7, 1985

[54] MINIMIZATION OF THE EFFECTS OF YAW OSCILLATIONS IN WIND TURBINES

[75] Inventor: Glidden S. Doman, Granby, Conn.

[73] Assignee: United Technologies Corporation, Hartford, Conn.

[21] Appl. No.: 440,056

[22] Filed: Nov. 8, 1982

[51] Int. Cl.³ .............................................. F03D 7/04
[52] U.S. Cl. ...................................... 416/11; 416/41; 416/500; 416/DIG. 6
[58] Field of Search ..................................... 416/11-14, 416/DIG. 6, DIG. 4, 41 A, 500, 43 A

[56] References Cited

U.S. PATENT DOCUMENTS

| | | | |
|---|---|---|---|
| 2,360,791 | 10/1944 | Putnam | 416/DIG. 4 |
| 2,517,135 | 8/1950 | Rudisill | 416/DIG. 6 |
| 2,784,556 | 3/1957 | Perdue | 416/13 X |
| 4,008,006 | 2/1977 | Bea | 416/41 A X |
| 4,160,170 | 7/1979 | Harner et al. | 416/41 A X |
| 4,201,514 | 5/1980 | Huetter | 416/11 X |
| 4,297,076 | 10/1981 | Donham et al. | 416/41 A X |
| 4,298,313 | 11/1981 | Hohenemser | 416/11 X |
| 4,329,117 | 5/1982 | Doman | 416/43 A X |
| 4,366,386 | 12/1982 | Hanson | 416/11 X |
| 4,366,387 | 12/1982 | Carter et al. | 416/132 B |
| 4,408,954 | 10/1953 | Earle | 416/43 A |
| 4,420,692 | 12/1983 | Kos et al. | 416/43 A |
| 4,435,647 | 3/1984 | Harner et al. | 416/43 A |

FOREIGN PATENT DOCUMENTS 2375649 8/1978 France ................................. 416/13

Primary Examiner—Everette A. Powell, Jr.
Attorney, Agent, or Firm—John Swiatocha

[57] ABSTRACT

Yaw (fishtail) oscillations in large wind turbines (10) are minimized by damping provided by a drive motor (65) connecting the turbine to the supporting tower (50) therefor at, for example, a yaw bearing (45). The drive motor drives the wind turbine in yaw and maintains desired yaw settings of the turbine. The motor is also capable of being driven by yaw oscillations of the wind turbine and in being so driven, dissipates the energy of such oscillations.

12 Claims, 2 Drawing Figures

4,515,525

MINIMIZATION OF THE EFFECTS OF YAW OSCILLATIONS IN WIND TURBINES

DESCRIPTION

1. Technical Field

This invention relates in general to wind turbines and specifically to the minimization of wind turbine instabilities manifested in yaw oscillations of the wind turbine.

2. Background Art

Typically, a modern wind turbine includes a teetered rotor having a plurality of airfoil blades mounted thereto and connected by a shaft to an electric generator or alternator through a gear box. The alternator and gear box are enclosed in a nacelle supported above the ground on a vertical cantilevered tower having an inherent flexibility. Often, the center of mass of the combination of the rotor, blades, generator and gear box enclosed by the nacelle is longitudinally (with respect to the nacelle) offset from the vertical centerline (axis) of the tower. The inherent flexibility of the cantilevered tower combined with the offset of the turbine's center of mass has proven to be troublesome, allowing yaw ("fishtail") oscillations in the turbine. It has been learned that such yaw oscillations are caused by a teetering of the rotor which excites (feeds energy to) a periodic lateral displacement of the upper portion of the tower. Such lateral tower displacements can result from such disturbances as wind gusts and the like. Assuming, for example, that the wind turbine is properly oriented in yaw, (in or close to the direction of the prevailing wind), and the upper portion of the tower is displaced and then released in a direction normal to the wind as by a lateral gust, the ensuing lateral oscillation momentarily angularly displaces the turbine shaft in a horizontal plane due to the offset of the center of gravity of the combination of the nacelle and rotor from the centerline of the tower. Rotation of the teetered blades simultaneously with such an angular oscillation will, due to gyroscopic effects, periodically shift the turbine's thrust vector angularly in a horizontal plane in a phase relationship with the lateral tower oscillations which excites the tower oscillations. Excitation of the tower oscillations reinforces the periodic thrust vector shift thereby resulting in the fishtail oscillations of the turbine nacelle noted above.

It will be appreciated that such fishtail oscillations of the turbine are highly undesirable from both safety and performance standpoints and should be avoided. It may at first seem that such yaw oscillations may be avoided by providing means to hold the wind turbine in yaw at the desired yaw setting. However, it will be seen that lateral movement of the upper portion of the tower due to the inherent flexibility thereof, will, as set forth hereinabove, still tend to cause an angular displacement of the turbine's shaft centerline which can severely load the yaw holding means. Moreover, the effect of the spring constant of the holding means can increase the natural frequency of lateral tower bending to one oscillation per revolution of the turbine rotor. If the rotor is at all unbalanced, tower bending oscillations will be substantially reinforced thereby loading the yaw holding means to unexceptably high levels and jeopardizing the structural integrity thereof.

DISCLOSURE OF INVENTION

Accordingly, among the objects of the present invention is the minimization of the risk of oscillatory yaw disturbances in a large wind turbine due to lateral bending of the wind turbine tower.

In accordance with the present invention, a wind turbine of the type which is mounted on a flexible tower and having a center of mass longitudinally offset from the vertical centerline of the tower is provided with drive means connected to the turbine for setting and holding the turbine at a desired yaw orientation, the drive means itself having the capability of being driven by the tendency of the turbine to fishtail in yaw, to damp such fishtail oscillations. Damping such oscillations minimizes the effects thereof and overcomes the tendency of the teetering action of the rotor to amplify this motion. In the preferred embodiment, the drive means comprises a fluid motor powered by pressurized fluid from a suitable source thereof for driving the wind turbine in yaw. Control valves are provided to simultaneously disconnect the motor from the fluid source and connect the motor to a discrete reservoir of fluid whereby energy which would otherwise cause the wind turbine to fishtail, powers the motor as a pump to extract fluid from the reservoir thereof, thereby dissipating the energy associated with such yaw oscillations.

BEST MODE FOR CARRYING OUT THE INVENTION AND INDUSTRIAL APPLICABILITY

Figure 1:
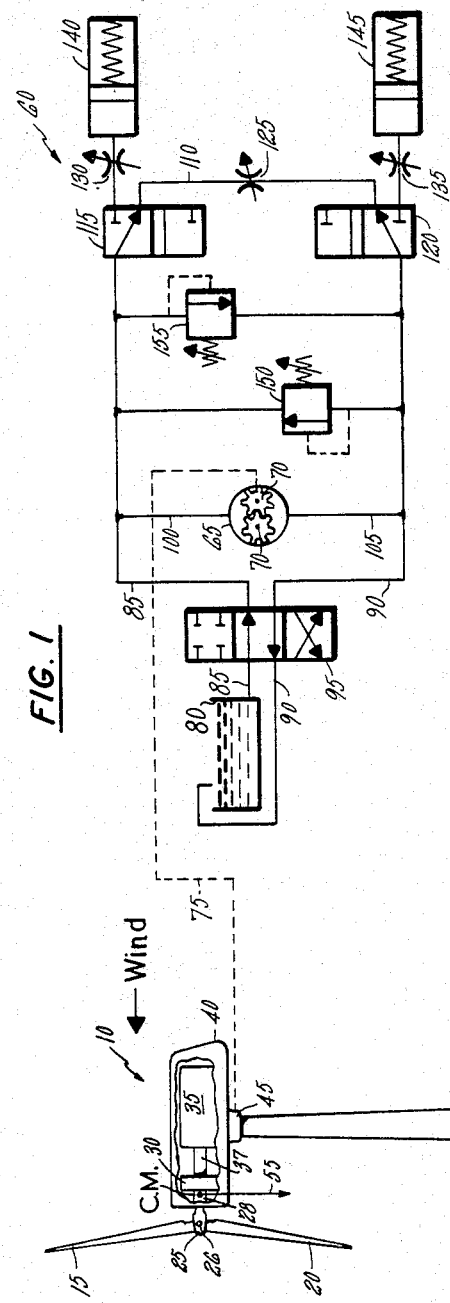
FIG. 1 is a schematic view of a wind turbine yaw drive and damping system in accordance with the present invention, the system being set for driving the turbine in yaw.

Referring to the drawing, a large wind turbine is shown at 10, the wind turbine comprising a pair of airfoil blades 15 and 20 mounted to a teetering rotatable hub 25 pivotally connected at hinge pin 26 to shaft 28. Shaft 28 connects to gear box 30 which steps up the rotational speed of the hub and blades to a value equal to the desired speed of rotation of electric generator or alternator 35 connected to the gear box by shaft 37. A nacelle 40 encloses the generator, gear box and connecting shafts. The nacelle includes a yaw bearing 45 which serves to support the nacelle on a tall inherently flexible (elastic), cantilevered tower 50. Wind turbine 10 is of the type wherein the rotor comprising the blades and hub is disposed downwind from the tower and nacelle. The center of mass (c.m.) associated with the rotor, nacelle and other turbine hardware is typically also located downwind from the tower, (longitudinally offset from the vertical axis thereof) the overall weight of the wind turbine excluding the tower thereof being represented by vector 55 extending through the center of mass.

As set forth hereinabove, such a combination of an inherently flexible, cantilevered tower supporting a wind turbine having a center of gravity thereof longitudinally offset from the tower can cause the wind turbine to experience severe yaw ("fishtail") oscillations in response to periodic lateral movement of the upper portion of the tower. To minimize the effects of such yaw oscillations, in accordance with the present invention, a system 60 is provided, the system including a drive means 65 mounted on the tower and connected to the nacelle for driving the wind turbine in yaw and absorbing energy from the tendency of the turbine to oscillate in yaw for damping such oscillations and minimizing the adverse effects associated therewith.

In the preferred embodiment, drive means 65 comprises a fluid motor including rotors or movable portions 70 connected to the nacelle at yaw bearing 45 by any suitable means represented schematically by phantom line 75. Fluid motor 65 may be of any of a number of known varieties wherein rotors 70 are driven by fluid flow thereagainst from a source of pressurized fluid 80 communicating with drive means 65 through lines 85 and 90, first control valve 95 disposed therein, and lines 100 and 105. For example, drive means 65 may comprise a gear pump as schematically illustrated. As illustrated, control valve 95 has three settings associated therewith, the upper setting (FIG. 2) blocking all flow to drive means 65 and the middle setting (shown in FIG. 1) allowing flow in a clockwise direction from source 80 through lines 85 and 100, drive means 65, and then lines 105 and 90 for driving rotor 70 and the connected nacelle in one yaw direction. In the third (lowermost) position flow from source 80 is channeled through the drive means in a reverse (counterclockwise) direction through line 85, first control valve 95, lines 90 and 105 the drive motor, lines 100 and 85, back through the control valve and finally line 90 for driving rotor 70 and the nacelle in the opposite direction. Thus, it is seen that a desired yaw setting may be achieved by selectively controlling the direction of the admission of fluid to drive motor 65 thereby powering rotor 70 thereof to drive the wind turbine about the yaw axis to the desired yaw heading. When a desired yaw heading has been achieved, the control valve is set to its uppermost position cutting off flow to the motor.

System 60 also includes a line 110 connected between lines 85 and 90 through control valves 115 and 120, line 110 including therein an adjustable orifice or similar flow restrictor 125. Flow restrictor 125 aids in controlling the flow through motor 65 by controlling the flow bypassing the motor through valves 115, 120 and line 110. As shown in the drawings, each of valves 115 and 120 has two settings associated therewith. The outer settings, illustrated in FIG. 1 serve to connect lines 85 and 90 with line 110 when drive motor 65 is driving the wind turbine in yaw in response to the admission of fluid to the drive motor from reservoir 80. The inner settings of valves 115 and 120 (FIG. 2) serve to connect lines 85 and 90 to adjustable damping means (variable restrictors) 130 and 135, respectively, which are in turn disposed in fluid communication with accumulators 140 and 145, respectively.

Figure 2:
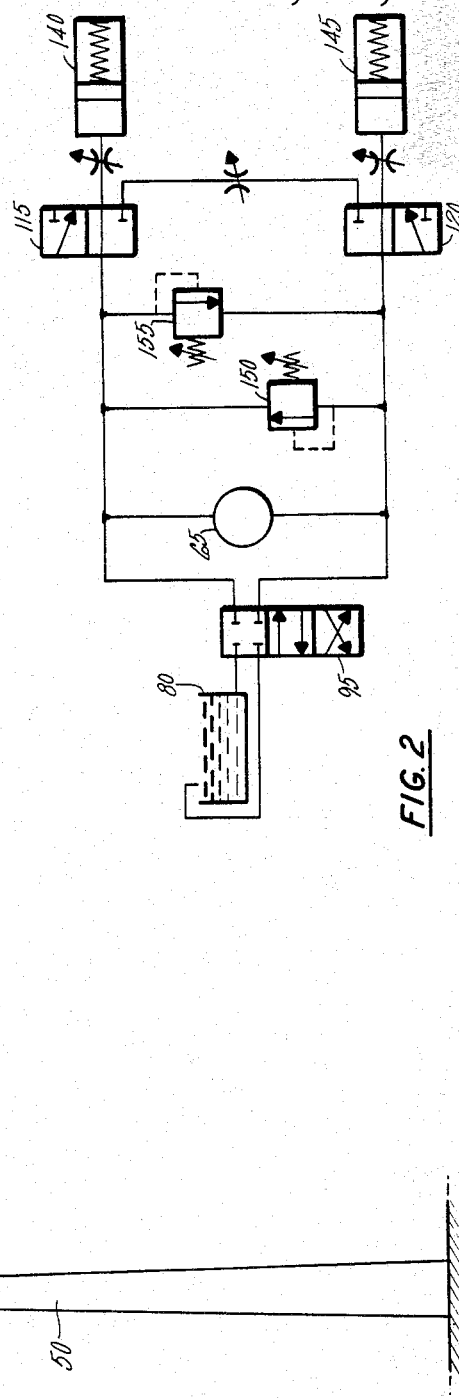
FIG. 2 is a view similar to FIG. 1 with the exception that in FIG. 2, the system is set for damping yaw oscillations of the wind turbine when the turbine is oriented in a desired yaw heading.

Referring particularly to FIG. 2, when the wind turbine is set in a desired yaw heading, control valve 95 is set to its uppermost position, cutting off flow from source 80 to drive motor 65. Assuming now that the tower is subjected to lateral periodic displacement thereof in the manner set forth hereinabove, such tower displacement will tend to induce yaw oscillations of the nacelle on the tower. The connection of rotors 70 to the nacelle causes such oscillations to turn the rotors whereupon motor 65 acts as a pump, pumping fluid from one accumulator to the other through control valves 115 and 120 set in the positions shown in FIG. 2 simultaneously with the cutting off of source 80 from motor 65. Thus, for example, a tendency of the turbine to oscillate in one direction pumps fluid in a generally counterclockwise direction from accumulator 140 through restrictor 130, valve 115, motor 65 (now acting as a pump), valve 120 and restrictor 135 to accumulator 145. An oscillation in the opposite direction will cause motor 65 to pump fluid in the opposite direction, from accumulator 145 to accumulator 140. Such pumping as those skilled in the art will appreciate, necessarily effects the dissipation of energy associated with such oscillations thereby damping the oscillations and minimizing the destabilizing effects thereof for maintenance of the wind turbine in the desired yaw heading. It is seen that such energy dissipation (damping) is effected by movement of rotors 70 against the back pressure of fluid in the lines and accumulators 140 and 145. Damping is enhanced by restrictors 130 and 135 which dissipates substantial amounts of energy as fluid is pumped therethrough by motor 65. In the event that yaw oscillation of severe magnitude come into play, relief valves 150 and 155 are actuated to allow flow therethrough to enhance the pumping capacity of the fluid motor from the inlet to the discharge thereof, thereby limiting the torsional loading passed to the tower through the yaw drive and damping system. To this end, valve 150 limits the torsional loading associated with yaw oscillations causing a clockwise pumping of fluid between the accumulators, and valve 155 limits the torsional loading due to oscillations associated with a counterclockwise pumping of fluid between the accumulators.

Accordingly, it is seen that yaw drive and damping system 60 effectively dissipates the energy associated with wind turbine yaw (fishtail) oscillations. This not only maintains the wind turbine at the desired yaw heading but also prevents excitation of tower bending due to rotor imbalances, torque transients, lateral wind gusts, and the lag of rotor teetering behind nacelle translational and yaw motion. Moreover, it is seen that in addition to the hereinabove discussed fishtail oscillations, the present invention serves to damp any dynamic free yaw instability in the wind turbine whether the turbine is operative, or inoperative with the blades parked in feathered positions. Furthermore, in the event of blade or turbine control system damage which would lower the natural frequency of edgewise bending of the blades, the system of the present invention provides a means for damping yaw disturbance due to such reduction in edgewise bending frequency. For the most effective implementation of the present invention, the yaw bearing should be selected for low friction characteristics whereby the system of the present invention will damp yaw oscillations generally throughout the entire period thereof.

While a particular embodiment of the present invention has been shown and described, it will be appreciated by those skilled in the art that various equivalent constructions may be employed without departing from the present invention. Thus, although the yaw drive and damping system has been shown in a fluid mechanical implementation thereof, it is noted that various electromechanical motors, brakes and the like may be employed with equal utility to achieve the desired results and it is intended by the appended claims to cover any such equivalent systems or modifications of the system described herein as fall within the true spirit and scope of this invention.

Having thus described the invention, what is claimed is:

1. In a wind turbine comprising a plurality of airfoil blades mounted on a rotatable hub, said wind turbine being mounted on a flexible cantilever tower and having a center of mass longitudinally offset therefrom and being pivotable about a yaw axis through said tower, the improvement characterized by:

drive means mounted on said tower, means connecting said drive means to said wind turbine whereby said wind turbine may be positively driven in yaw by said drive means, said drive means including as an integral part thereof, driven means connected to said wind turbine, said driven means at selected yaw conditions of said wind turbine being drivable through said connecting means by yaw oscillations of said wind turbine resulting from lateral bending of said tower for the damping of such yaw oscillations by the dissipation of energy associated therewith.

2. The improvement of claim 1 characterized by said drive means and driven means comprising a fluid motor connected at a movable portion thereof to said wind turbine, said movable portion being driven by fluid flow thereagainst for driving said wind turbine in yaw and functioning to pump said fluid therefrom when driven by said wind turbine yaw oscillations.

3. The improvement of claim 2 characterized by a source of said fluid and a first control valve communicating with said fluid motor and said source for controlling the supply of fluid to said motor from said source.

4. The improvement of claim 3 characterized by said first control valve having a first setting which accommodates fluid flow from said source to said motor in a first direction, a second setting which accommodates fluid flow from said source to said motor in a second direction opposite to said first direction, and a third setting which blocks flow to said motor for allowing said motor to be driven by said wind turbine yaw oscillations.

5. The improvement of claim 2 characterized by means associated with said drive means for damping movement thereof when driven by said wind turbine yaw oscillations for enhancing the damping thereof.

6. The improvement of claim 5 characterized by said damping means comprising a restriction impeding the flow of fluid pumped by said fluid motor when driven by said wind turbine yaw oscillations.

7. The improvement of claim 6 characterized by an accumulator accommodating therewithin fluid pumped by said fluid motor through said restriction.

8. The improvement of claim 6 characterized by a second control valve communicating with said fluid motor and said damping means for controlling the flow of fluid therebetween.

9. The improvement of claim 8 characterized by said second control valve having a first setting which accommodates fluid flow from said fluid motor to said damping means and a second setting whereby fluid communication between said fluid motor and said damping means is blocked.

10. The improvement of claim 1 characterized by means connected between said turbine and said tower for limiting torsional loading of said tower from yaw oscillations of said turbine.

11. The improvement of claim 10 characterized by said drive means comprising a fluid motor connected at a movable portion thereof to said wind turbine, said movable portion being driven by fluid flow thereagainst for driving said wind turbine in yaw and functioning to pump said fluid therefrom when driven by said wind turbine yaw oscillations, said means for limiting torsional loading of said tower comprising a relief valve connected across said turbine said relief valve accommodating flow therethrough from said fluid motor for enhancing the pumping capacity of said fluid motor and the dissipation of energy associated with said yaw oscillations.

12. The improvement of claim 2 characterized by a flow restrictor connected across said fluid motor for controlling the flow of fluid therethrough when said motor drives said wind turbine in yaw.

* * * * *